(12) United States Patent
Wen et al.

(10) Patent No.: US 11,881,880 B2
(45) Date of Patent: Jan. 23, 2024

(54) BAND14 SIGNAL SUPPRESSION CIRCUIT AND SMART TERMINAL DEVICE

(71) Applicant: HuiZhou TCL Mobile Communication Co., Ltd., Guangdong (CN)

(72) Inventors: Dingning Wen, HuiZhou (CN); Yu Jia, HuiZhou (CN); Longxi Tao, HuiZhou (CN); Hua Zhang, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 301 days.

(21) Appl. No.: 17/435,707

(22) PCT Filed: Nov. 20, 2019

(86) PCT No.: PCT/CN2019/119789
§ 371 (c)(1),
(2) Date: Sep. 2, 2021

(87) PCT Pub. No.: WO2020/238078
PCT Pub. Date: Dec. 3, 2020

(65) Prior Publication Data
US 2022/0158668 A1    May 19, 2022

(30) Foreign Application Priority Data
May 31, 2019 (CN) .......................... 201910472220.7

(51) Int. Cl.
*H04B 1/04* (2006.01)
*H04B 1/10* (2006.01)
*H03H 7/00* (2006.01)

(52) U.S. Cl.
CPC ......... *H04B 1/0475* (2013.01); *H04B 1/1018* (2013.01); *H04B 1/1036* (2013.01); *H04B 2001/0408* (2013.01)

(58) Field of Classification Search
None
See application file for complete search history.

(56) References Cited

U.S. PATENT DOCUMENTS 6,104,259 A * 8/2000 Miyaura ............... H03H 7/1758
 333/204
6,625,470 B1 * 9/2003 Fourtet ................ H04B 1/0483
 330/136

(Continued)

FOREIGN PATENT DOCUMENTS

CN 203135865 8/2013
CN 103856238 6/2014

(Continued)

OTHER PUBLICATIONS

International Search Report and the Written Opinion dated Feb. 26, 2020 From the International Searching Authority Re. Application No. PCT/CN2019/119789 and Its Translation of Search Report Into English. (8 Pages).

(Continued)

*Primary Examiner* — Tuan A Tran

(57) ABSTRACT

Provided in the present application are a band14 signal suppression circuit and a smart terminal device being equipped with a duplexer, an active low-pass filter, and a resonant filter in a band14 transmission path, implementing filtering and suppression on the second harmonic in the band14 signal, and eliminating the interference of band14 signals on assisted global positioning system signals.

19 Claims, 3 Drawing Sheets

(56) References Cited

U.S. PATENT DOCUMENTS

| | | | | |
|---|---|---|---|---|
| 6,727,786 | B2* | 4/2004 | Toncich | H04B 1/40 333/205 |
| 7,589,604 | B2* | 9/2009 | Ninan | H01P 1/203 333/176 |
| 7,808,342 | B2* | 10/2010 | Prikhodko | H03H 7/1766 333/32 |
| 8,369,816 | B2* | 2/2013 | Ninan | H01P 1/20 333/205 |
| 9,077,405 | B2* | 7/2015 | Jones | H03F 1/0227 |
| 9,287,904 | B2* | 3/2016 | Nentwig | H04B 1/0483 |
| 9,692,373 | B2* | 6/2017 | Staudinger | H03F 3/2171 |
| 9,712,196 | B2* | 7/2017 | Ripley | H03H 7/0153 |
| 9,882,587 | B2* | 1/2018 | Feng | H03F 3/245 |
| 9,900,204 | B2* | 2/2018 | Levesque | H03F 3/195 |
| 10,340,963 | B2* | 7/2019 | Ripley | H04B 1/18 |
| 10,439,564 | B1* | 10/2019 | Costa | H03F 3/195 |
| 10,587,226 | B2* | 3/2020 | Ahmed | H03F 3/195 |
| 10,886,953 | B2* | 1/2021 | Feng | H03F 3/72 |
| 2009/0280757 | A1 | 11/2009 | Zhu et al. | |
| 2019/0051980 | A1 | 2/2019 | Ahn et al. | |

FOREIGN PATENT DOCUMENTS

| | | |
|---|---|---|
| CN | 104506143 | 4/2015 |
| CN | 107835034 | 3/2018 |
| CN | 109474284 | 3/2019 |
| KR | 10-0899102 | 5/2009 |

OTHER PUBLICATIONS

Notification of Office Action and Search Report dated Dec. 27, 2019 From the State Intellectual Property Office of the People's Republic of China Re. Application No. 201910472220.7 and Its Translation of Office Action Into English. (14 Pages).

* cited by examiner

BAND14 SIGNAL SUPPRESSION CIRCUIT AND SMART TERMINAL DEVICE

RELATED APPLICATIONS

This application is a National Phase of PCT Patent Application No. PCT/CN2019/119789 having International filing date of Nov. 20, 2019, which claims the benefit of priority of Chinese Patent Application No. 201910472220.7 filed on May 31, 2019. The contents of the above applications are all incorporated by reference as if fully set forth herein in their entirety.

FIELD AND BACKGROUND OF THE INVENTION

The present invention relates to a technical field of communication technologies, and more particularly, to a suppression circuit for band14 signals and a smart terminal device.

Long Term Evolution (LTE) is a long-term evolution of the Universal Mobile Telecommunications System (UMTS) technology standard developed by the 3rd Generation Partnership Project (3GPP) organization.

LTE defines several frequency bands, among which band14 comprises 788 MHz-798 MHz. When assisted Global Positioning System (AGPS) function is used for smart terminal devices in the North American market, because the frequency of AGPS signal is around 1.574G, a frequency band of the second harmonic of the band14 signal is located near the frequency band of the AGPS signal, and the band14 signal causes great interference to the AGPS signal received by a smart terminal device.

So far, no good solution is available to perfectly eliminate the interference of the band14 signal to the AGPS signal.

SUMMARY OF THE INVENTION

Technical Problems

The present application provides a band14 signal suppression circuit and a smart terminal device capable of ameliorating the interference of band14 signals with the reception of assisted GPS signals at a smart terminal device.

Technical Solutions

The application provides a band14 signal suppression circuit comprising a duplexer, an active low-pass filter, and a resonant filter. An input of the duplexer is connected to a transmitter through a power amplifier, an output of the duplexer is connected to an input of the active low-pass filter, an output of the active low-pass filter is connected to a main antenna, and the resonant filter is connected in parallel between the active low-pass filter and the main antenna. The power amplifier receives a band 14 signal sent by the transmitter for power amplification. The duplexer, the active low-pass filter and the resonant filter cooperatively filter and suppress second harmonic in the band14 signal after power amplification to eliminate interference of the band14 signal to an assisted GPS signal. The resonant filter is an open line, the open line has a length of $\lambda'$, wherein $\lambda'$, $\lambda'=\frac{1}{4}\lambda$, $\lambda=c/f$, c is a speed of light, and f is a frequency of the assisted GPS signal. The suppression circuit further comprises an inductor with one end being grounded and the other end being connected to a common end of the resonant filter and the main antenna.

On the basis of the above technical solution, the present application can be improved as follows.

Further, the resonant filter is a group of coils formed by wrapping multiple turns counterclockwise or clockwise around one end of the open line as a wrapping center.

Further, the wrapping center is an open end and the other end of the open line is connected to a microstrip line as an input terminal, and the input terminal is connected to the active low pass filter and the main antenna.

Further, the microstrip line has a length of 25 mils and the microstrip line has a characteristic impedance of 50 ohms.

Further, the open line has a line width of 5 mils, a line spacing between two coils is 5 mils, and the number of wrapped turns is 5.5 turns.

Further, the resonant filter has a height of 135 mils and a width of 115 mils.

The application further provides a band14 signal suppression circuit comprising a duplexer, an active low-pass filter, and a resonant filter. An input of the duplexer is connected to a transmitter through a power amplifier, and an output of the duplexer is connected to an input of the active low-pass filter. An output of the active low-pass filter is connected to a main antenna. The resonant filter is connected in parallel between the active low-pass filter and the main antenna. The power amplifier is configured to receive and power amplify the band 14 signal sent by the transmitter. The duplexer, active low-pass filter, and resonant filter cooperatively filter and suppress second harmonic in the power amplified band14 signal to eliminate interference of the band14 signal with the assisted GPS signal.

On the basis of the above technical solution, the present application can be improved as follows.

Further, the resonant filter is an open line, the open line has a length of $\lambda'$, wherein $\lambda'$, $\lambda'=\frac{1}{4}\lambda$, $\lambda=c/f$, c is a speed of light, and f is a frequency of the assisted GPS signal.

Further, the resonant filter is a group of coils formed by wrapping multiple turns counterclockwise or clockwise around one end of the open line as a wrapping center.

Further, the wrapping center is an open end and the other end of the open line is connected to a microstrip line as an input terminal, and the input terminal is connected to the active low pass filter and the main antenna.

Further, the open line has a line width of 5 mils, a line spacing between two coils is 5 mils, and the number of wrapped turns is 5.5 turns.

Further, the open line has a characteristic impedance of 50 ohms.

Further, the microstrip line has a length of 25 mils and the microstrip line has a characteristic impedance of 50 ohms.

Further, the resonant filter has a height of 135 mils and a width of 115 mils.

Further, the suppression circuit further comprises an inductor with one end being grounded and the other end being connected to a common end of the resonant filter and the main antenna.

The application further provides a smart terminal device comprising a band14 signal suppression circuit.

Useful Effects

The application provides a band14 signal suppression circuit and a smart terminal device, where a duplexer, an active low-pass filter and a resonant filter are arranged in a band14 transmission path, and the duplexer, active low-pass filter and resonant filter are used to synergistically filter and suppress the second harmonic in the band14 signal, significantly filter out the second harmonic in the band14 signal, and eliminate the interference effect caused by the band14 signal on the assisted GPS signal.

BRIEF DESCRIPTION OF THE SEVERAL VIEWS OF THE DRAWINGS

To clear disclose the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

Figure 1:
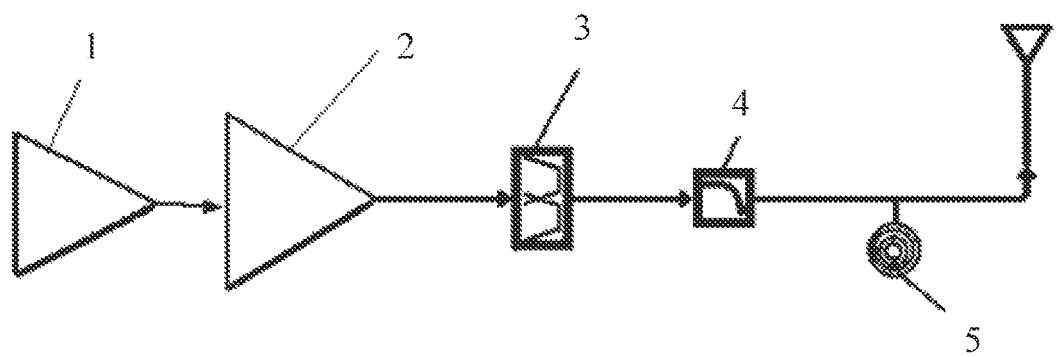
FIG. 1 is a schematic diagram of a band14 signal suppression circuit of an embodiment of the present application.

In the accompanying drawings, terms of the components represented by the respective symbols are listed in the following.

1: transmitter;
2: power amplifier;
3: duplexer;
4: active low-pass filter;
5: resonant filter;
6: microstrip line.

DESCRIPTION OF SPECIFIC EMBODIMENTS OF THE INVENTION

Specific embodiments of the present application are described in further detail in the following in conjunction with the accompanying drawings and embodiments. The following embodiments are used to illustrate the invention, but are not intended to limit the scope of the invention.

In the field of communications, Long Term Evolution (LTE) is a long-term evolution of the Universal Mobile Telecommunications System (UMTS) technology standard developed by the 3rd Generation Partnership Project (3GPP) organization. LTE system introduces certain key technologies, such as orthogonal frequency division multiplexing (OFDM) and multi-input and multi-output (MIMO) that, significantly increases spectral efficiency and data transmission rate (in the case of 20M bandwidth, 2 by 2 MIMO, and 64 QAM, theoretical maximum downlink transmission rate is 201 Mbps, or 150 Mbps if exempted from signaling overhead. However, according to actual network and terminal capacity limitations, generally recognized peak rates are 100 Mbps for downlink and 50 Mbps for uplink), and supports multiple bandwidth allocations: 1.4 MHz, 3 MHz, 5 MHz, 10 MHz, 15 MHz and 20 MHz, and supports the global mainstream 2G/3G bands and some new bands, so that spectrum allocation is more flexible, and system capacity and coverage are significantly improved.

Currently, LTE defines more than 40 frequency bands, and each band is called a band. In particular, band14 is 788 MHz-798 MHz, for the North American market. Most smart terminal devices work with band14. The smart terminal device with positioning function activated also receives signals of the assisted global positioning system (AGPS) signal at frequency 1.574 GHz. Thus, the second harmonic of the band14 signal is near the AGPS signal band, and the second harmonic of the band14 signal may interfere with the AGPS signal. Consequently, the positioning function of the smart terminal device may be abnormal or not accurate enough.

To solve this problem mentioned above, with reference to FIG. 1, one embodiment of the present invention provides a suppression circuit for band14 signal, which includes a duplexer 3, an active low-pass filter (LPF) 4 and a resonant filter 5. An input of the duplexer 3 is connected to the transmitter 1 through a power amplifier 2, and an output of the duplexer 3 is connected to an input of the active low-pass filter 4, an output of the active low-pass filter LPF 4 is connected to a main antenna, and the resonant filter 5 is connected in parallel between the active low-pass filter 4 and the main antenna.

In particular, the power amplifier 2 receives and power amplifies the band14 signal sent by the transmitter 1. The power amplified band14 signal passes through the duplexer 3, the active low pass filter (LPF) 4, and the resonant filter 5 in succession. The duplexer 3, the active low pass filter 4, and the resonant filter 5 synergistically filter and suppress the second harmonic in the power amplified band14 signal. The band14 signal after filtering and suppression has no interference effect on the Assisted Global Positioning System (AGPS) signal. This embodiment uses the three-stage cascade of filtering suppression comprising the duplexer 3, the active low-pass filter LPF 4, and the resonant filter 5 to more perfectly filter out the second harmonic in the band14 signal, eliminating the interference of the band14 signal to the AGPS signal, so that the positioning function of the smart terminal device may not be affected.

Specifically, the band14 signal suppression circuit provided in this embodiment is equipped with the duplexer 3, the active low-pass filter LPF 4, and the resonant filter 5 in a band14 transmitting path. The band14 signal transmitted by transmitter 1 is filtered and suppressed by duplexer 3 and active low-pass filter LPF 4 and radiated out through the main antenna, and the radiated band14 signal has no interference with the AGPS signal. In particular, the duplexer 3 and the active low-pass filter LPF 4 can suppress the second harmonic of the band14 signal. Typically, the duplexer 3 can suppress the second harmonic of the band14 signal by 48 decibels (dB), and the active low-pass filter LPF 4 can suppress the second harmonic of the band14 signal by 35 dB. Therefore, with the combined suppression effect of duplexer 3 and active low-pass filter LPF 4, the second harmonic of band14 signal can be suppressed by 83 dB, which is not a perfect suppression effect. Therefore, a resonant filter 5 is provided in addition to the duplexer 3 and the active low-pass filter LPF 4. In particular, the resonant filter 5 can suppress the second harmonic of the band14 signal by 23 dB. After the triple suppression effect of the duplexer 3, the active low-pass filter LPF 4, and the resonant filter 5, the second harmonic of the band14 signal is filtered out more perfectly. The interference of the band14 signal to the AGPS signal is completely eliminated.

It should be noted that the band14 signal suppression circuit in this embodiment has no suppression effect on primary harmonic of the band14 signal, also known as the main wave of the band14 signal, but only suppresses the second harmonic of the band14 signal, which will not affect main functioning of the band14 signal. In this case, the resonant filter 5 has a suppression of 0.085 dB for the main wave of the band14 signal and 23.158 dB for the second harmonic of the band14 signal, which may not affect the main functioning of the band14 signal.

In an embodiment of the present application, the resonant filter 5 is an open line, and the length of the open line is $\lambda'$, $\lambda'=\frac{1}{4}\lambda$, $\lambda=c/f$, where c is the speed of light and f is the AGPS signal frequency, f=1.574 GHz, $\lambda'$=1870 mil.

Specifically, the resonant filter 5 is a ¼ wavelength open line. Since the band14 signal can be radiated using a length ¼ wavelength, the resonant filter 5 of only ¼ wavelength is required to be connected in parallel to the band14 transmit path, and the length of the open line is calculated as 1870 mil according to the above formulas.

Figure 2:
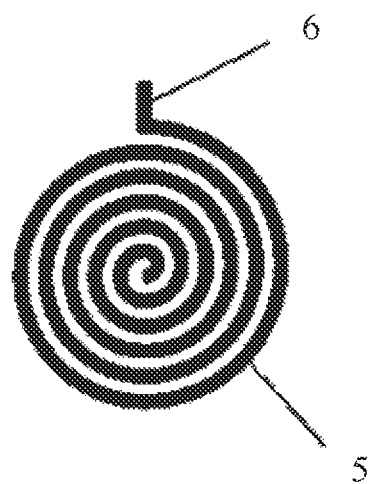
FIG. 2 a schematic diagram of a resonant filter of an embodiment of the present application.

Referring to FIG. 2, in one embodiment of the present invention, the resonant filter 5 is a group of coils formed by wrapping multiple turns counterclockwise or clockwise around one end of the open line as a wrapping center.

Since the direct parallel connection of the 1870 mil open line on the transmit path of band 14 can occupy a very large space, the embodiment of the present invention provides further arrangement for the 1870 mil open line. The further arrangement comprises wrapping multiple turns of the open line counterclockwise or clockwise around one end of the open line as a wrapping center to form a group of coils as the resonant filter 5. The total length of the open line is 1870 mil, and the space occupied by the open line is smaller than that of the original open line.

In particular, the wrapping center is an open line, and the other end of the open line is connected to a microstrip line 6 as an input, and the input is connected to the LPF and the main antenna. That is, the end of the resonant filter 5 used as the wrapping center is an open circuit, and the other end is connected to a microstrip line 6 as an input. The resonant filter 5 is connected in parallel between the active low-pass filter LPF 4 and the main antenna via the microstrip line 6. In particular, characteristic impedance of the open line wrapped in form of the resonant filter 5 and the microstrip line 6 are both 50 ohms.

In one embodiment of the present invention, a line width of the open line is designed to be 5 mils, the line spacing between two adjacent turns is designed to be 5 mils, a number of wrapped turns is 5.5, and a length of the microstrip line 6 is 25 mils.

It should be noted that this embodiment does not limit the line width of the open line and the line spacing between the two adjacent turns. When the line width of the open line and the line spacing between the two adjacent turns are designed differently, then the number of wrapped turns may be different accordingly, as long as the total length of the open line is 1870 mils.

The resonant filter 5 shares a partially overlapped portion with the microstrip line 6 at a connection between the resonant filter 5 and the microstrip line 6, and a length of the overlapped portion is 5 mils, as shown in FIG. 2. The open line is wrapped according to the aforementioned arrangement and formed on the PCB board, and the wrapped and formed resonant filter 5 has a height of 135 mils and a width of 115 mils on the PCB stack, where a direction of the resonant filter 5 connecting the microstrip line 6 is a height direction, and a direction perpendicular to the height direction is a width direction.

Figure 3:
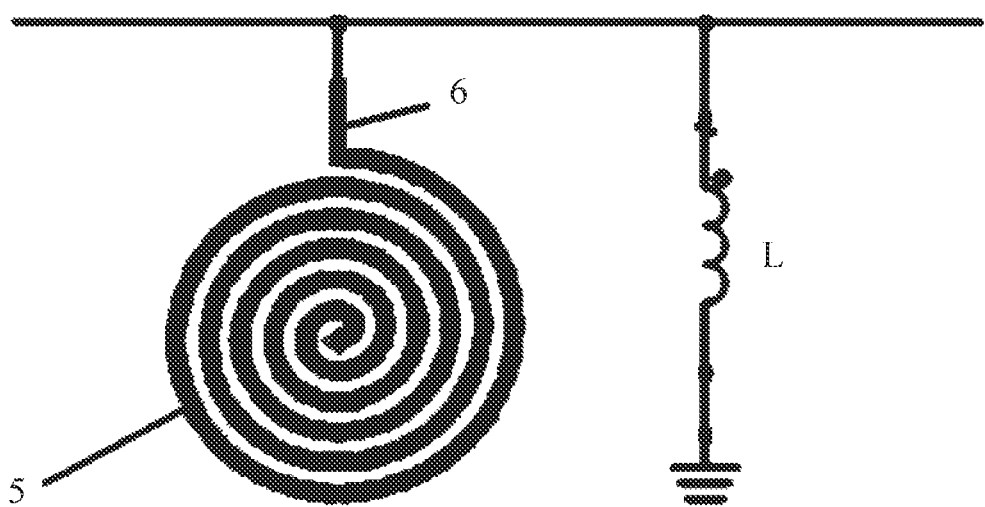
FIG. 3 is a schematic diagram of a band14 signal suppression circuit of another embodiment of the present application.

With reference to FIG. 3, in one embodiment of the present invention, the band14 signal suppression circuit further includes an inductor L based on FIG. 1. One end of the inductor L is grounded and the other end is connected to a common end of the resonant filter 5 and the main antenna. The inductor L is used to fine-tune a resonance point of the resonant filter 5 to improve operating performance of the resonant filter 5.

A further embodiment of the present application provides a smart terminal device comprising the band14 signal suppression circuit of the aforementioned embodiment.

By installing the band14 signal suppression circuit of the embodiment in the smart terminal device, the suppression circuit in the smart terminal device with the GPS positioning function activated is able to suppress the second harmonic of the band14 signal, and the suppressed band14 signal does not interfere with the assisted GPS AGPS signal received by the smart terminal device. Therefore, if the suppression circuit of the band14 signal is designed in the intelligent terminal, the smart terminal device may not be interfered by the band14 signal when receiving the AGPS signal, and keep the positioning function to work normally.

The application provides a band14 signal suppression circuit and a smart terminal device, in which a duplexer, an active low-pass filter and a resonant filter are designed in a band14 transmitting path. The duplexer, the active low-pass filter, and the resonant filter are used cooperatively to filter and suppress the second harmonic in the band14 signal, so as to perfectly filter out the second harmonic in the band14 signal and eliminate the interference effect caused by the band14 signal to the assisted global positioning system signal.

In summary, although this application has disclosed the preferred embodiment as above, the preferred embodiments are not used to limit this application. Persons with ordinary skills in the art can do modification or improvement without departing from the spirit and scope of this application. Therefore, the scope of protection of this application is subject to the scope defined by the claims.

What is claimed is:

1. A band14 signal suppression circuit comprising:
   a duplexer;
   an active low-pass filter; and
   a resonant filter, wherein an input of the duplexer is connected to a transmitter through a power amplifier, an output of the duplexer is connected to an input of the active low-pass filter, an output of the active low-pass filter is connected to a main antenna, and the resonant filter is connected in parallel between the active low-pass filter and the main antenna;
   the power amplifier receives a band 14 signal sent by the transmitter for power amplification;
   the duplexer, the active low-pass filter and the resonant filter cooperatively filter and suppress second harmonic in the band14 signal after power amplification to eliminate interference of the band14 signal to an assisted GPS signal;
   the resonant filter is an open line, the open line has a length of $\lambda'$, wherein $\lambda'$, $\lambda'\frac{1}{4}\lambda$, $\lambda=c/f$, is a speed of light, and f is a frequency of the assisted GPS signal; and
   the suppression circuit further comprises an inductor with one end being grounded and the other end being connected to a common end of the resonant filter and the main antenna.

2. The band14 signal suppression circuit according to claim 1, wherein the resonant filter is a group of coils formed by wrapping multiple turns counterclockwise or clockwise around one end of the open line as a wrapping center.

3. The band14 signal suppression circuit according to claim 2, wherein the wrapping center is an open end and the other end of the open line is connected to a microstrip line as an input terminal, and the input terminal is connected to the active low pass filter and the main antenna.

4. The band14 signal suppression circuit according to claim 3, wherein the microstrip line has a length of 25 mils and the microstrip line has a characteristic impedance of 50 ohms.

5. The band14 signal suppression circuit according to claim 3, wherein the resonant filter shares a partially overlapped portion with the microstrip line at a connection between the resonant filter and the microstrip line.

6. The band14 signal suppression circuit according to claim 5, wherein a length of the overlapped portion is 5 mils.

7. The band14 signal suppression circuit according to claim 2, wherein the open line has a line width of 5 mils, a line spacing between two coils is 5 mils, and the number of wrapped turns is 5.5 turns.

8. The band14 signal suppression circuit according to claim 7, wherein the resonant filter has a height of 135 mils and a width of 115 mils.

9. A band14 signal suppression circuit comprising a duplexer, an active low-pass filter, and a resonant filter, an input of the duplexer is connected to a transmitter through a power amplifier, an output of the duplexer is connected to an input of the active low-pass filter, an output of the active low-pass filter is connected to a main antenna, the resonant filter is connected in parallel between the active low-pass filter and the main antenna;
wherein the power amplifier is configured to receive and power amplify the band 14 signal sent by the transmitter; and
the duplexer, active low-pass filter and resonant filter cooperatively filter and suppress second harmonic in the power amplified band14 signal to eliminate interference of the band14 signal with an assisted GPS signal wherein the resonant filter is an open line, the open line has a length of $\lambda'$, wherein $\lambda'$, $\lambda'=\frac{1}{4}\lambda$, $\lambda=c/f$, c is a speed of light, and f is a frequency of the assisted GPS signal.

10. The band14 signal suppression circuit according to claim 9, wherein the resonant filter is a group of coils formed by wrapping multiple turns counterclockwise or clockwise around one end of the open line as a wrapping center.

11. The band14 signal suppression circuit according to claim 10, wherein the wrapping center is an open end and the other end of the open line is connected to a microstrip line as an input terminal, and the input terminal is connected to the active low pass filter and the main antenna.

12. The band14 signal suppression circuit according to claim 11, wherein the microstrip line has a length of 25 mils and the microstrip line has a characteristic impedance of 50 ohms.

13. The band14 signal suppression circuit according to claim 11, wherein the open line has a characteristic impedance of 50 ohms.

14. The band14 signal suppression circuit according to claim 10, wherein the resonant filter shares a partially overlapped portion with the microstrip line at a connection between the resonant filter and the microstrip line.

15. The band14 signal suppression circuit according to claim 14, wherein a length of the overlapped portion is 5 mils.

16. The band14 signal suppression circuit according to claim 10, wherein the open line has a line width of 5 mils, a line spacing between two coils is 5 mils, and the number of wrapped turns is 5.5 turns.

17. The band14 signal suppression circuit according to claim 16, wherein the resonant filter has a height of 135 mils and a width of 115 mils.

18. The band14 signal suppression circuit according to claim 9, wherein the suppression circuit further comprises an inductor with one end being grounded and the other end being connected to a common end of the resonant filter and the main antenna.

19. A smart terminal device comprising a band14 signal suppression circuit as of claim 7.

* * * * *